United States Patent
Hayes et al.

(10) Patent No.: US 10,452,414 B2
(45) Date of Patent: Oct. 22, 2019

(54) ASSISTIVE TECHNOLOGY NOTIFICATIONS FOR RELEVANT METADATA CHANGES IN A DOCUMENT

(71) Applicant: Microsoft Technology Licensing, LLC., Redmond, WA (US)

(72) Inventors: Edward Sean Hayes, Redmond, WA (US); Stephanie Lyn Burg, Seattle, WA (US); Paul James Reid, Woodinville, WA (US); Seth David Fox, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 462 days.

(21) Appl. No.: 15/199,841

(22) Filed: Jun. 30, 2016

(65) Prior Publication Data
US 2018/0004547 A1    Jan. 4, 2018

(51) Int. Cl.
*G06F 17/00* (2019.01)
*G06F 9/451* (2018.01)
(Continued)

(52) U.S. Cl.
CPC .............. *G06F 9/453* (2018.02); *G06F 9/542* (2013.01); *G06F 16/1873* (2019.01);
(Continued)

(58) Field of Classification Search
CPC .. G06F 17/211; G06F 17/30345; G06F 9/542; G06F 17/274; G06F 17/2725; G06F 17/273; G06F 16/1873; G06F 16/93
See application file for complete search history.

(56) References Cited

U.S. PATENT DOCUMENTS

| | | | | |
|---|---|---|---|---|
| 5,649,222 A | * | 7/1997 | Mogilevsky | .......... G06F 17/273 715/257 |
| 6,715,142 B1 | * | 3/2004 | Saito | ..................... G06F 21/126 717/159 |

(Continued)

FOREIGN PATENT DOCUMENTS

| WO | 2001009755 A2 | 2/2001 |
|---|---|---|
| WO | 2012076742 A1 | 6/2012 |

OTHER PUBLICATIONS

Watson, Leionie, "Screen reader support for ARIA live regions", posted on Monday, Mar. 17, 2014, https://developer.paciellogroup.com/blog/2014/03/screen-reader-support-aria-live-regions/ (Year: 2014).*

(Continued)

*Primary Examiner* — Laurie A Ries
(74) *Attorney, Agent, or Firm* — Merchant & Gould

(57) ABSTRACT

User interface information related to relevant events of interest is provided. Events can occur anywhere in a document, and may or may not be relevant to a user utilizing an assistive technology (AT) application, such as a screen reader. A provider-side signaling system component determines whether raised events are relevant to the user. In some examples, when an application makes a plurality of attribute changes in a document at once, the signaling provider batches the related events as a single transaction, and generates a generalized annotation describing the changes. The signaling provider further packages the event notification, and sends the event notification to a client-side signaling system component. The signaling client receives the notification, and determines whether to alert the user of the event(s) based on verbosity settings. The AT application is enabled to interpret the event notification and alert the user in a meaningful way.

20 Claims, 14 Drawing Sheets

(51) Int. Cl.
*G06F 16/93* (2019.01)
*G06F 16/23* (2019.01)
*G06F 9/54* (2006.01)
*G06F 17/24* (2006.01)
*G06F 17/27* (2006.01)
*G06F 16/18* (2019.01)

(52) U.S. Cl.
CPC .......... *G06F 16/2358* (2019.01); *G06F 16/93* (2019.01); *G06F 17/24* (2013.01); *G06F 17/273* (2013.01); *G06F 17/274* (2013.01); *G06F 17/2725* (2013.01)

(56) References Cited

U.S. PATENT DOCUMENTS

| | | | | |
|---|---|---|---|---|
| 6,847,957 | B1* | 1/2005 | Morley | G06Q 10/10 706/47 |
| 7,720,882 | B2* | 5/2010 | Liu | G06F 17/30126 707/706 |
| 7,743,340 | B2* | 6/2010 | Horvitz | G05B 19/404 715/710 |
| 8,006,180 | B2* | 8/2011 | Tunning | G06F 17/273 715/257 |
| 8,171,387 | B2* | 5/2012 | Lombardo | G06F 17/2288 715/200 |
| 8,321,786 | B2* | 11/2012 | Lunati | G06F 17/273 715/234 |
| 8,823,507 | B1* | 9/2014 | Touloumtzis | H04L 67/24 340/501 |
| 2003/0227392 | A1* | 12/2003 | Ebert | G06K 17/00 340/8.1 |
| 2004/0205540 | A1* | 10/2004 | Vulpe | G06F 17/30011 715/250 |
| 2006/0123053 | A1* | 6/2006 | Scannell, Jr. | G06F 16/437 |
| 2009/0006950 | A1* | 1/2009 | Gross | G06F 17/274 715/259 |
| 2010/0017701 | A1* | 1/2010 | Bargeron | G06F 17/24 715/230 |
| 2010/0262914 | A1* | 10/2010 | Todd | G06F 16/9577 715/729 |
| 2011/0066941 | A1* | 3/2011 | Chipchase | G06F 3/167 715/716 |
| 2011/0197124 | A1* | 8/2011 | Garaventa | G06F 16/972 715/234 |
| 2011/0300516 | A1* | 12/2011 | Wigdor | G09B 21/007 434/116 |
| 2012/0235921 | A1* | 9/2012 | Laubach | G06F 3/0238 345/172 |
| 2014/0143687 | A1* | 5/2014 | Tan | G06F 3/1462 715/757 |
| 2014/0208230 | A1* | 7/2014 | Stanley | G06F 17/273 715/753 |
| 2014/0289188 | A1* | 9/2014 | Shimanovsky | G06F 16/21 707/609 |
| 2015/0156150 | A1* | 6/2015 | Bartkiewicz | G06F 3/048 715/752 |
| 2015/0180966 | A1* | 6/2015 | Villaron | G06F 3/0484 715/753 |
| 2016/0098392 | A1* | 4/2016 | Clarke | G06F 21/6245 713/168 |
| 2016/0192111 | A1* | 6/2016 | Choi | H04L 67/26 455/507 |
| 2017/0371414 | A1* | 12/2017 | Keslin | G06F 3/016 |

OTHER PUBLICATIONS

Lawson, Judy, "Spelling and Grammar Checkers", Published on: Jul. 14, 2010 Available at: http://de.hpu.edu/hnguyen/Lawson.pdf.
"International Search Report and Written Opinion Issued in PCT Application No. PCT/US2017/038914", dated Oct. 9, 2017, 12 Pages.

* cited by examiner

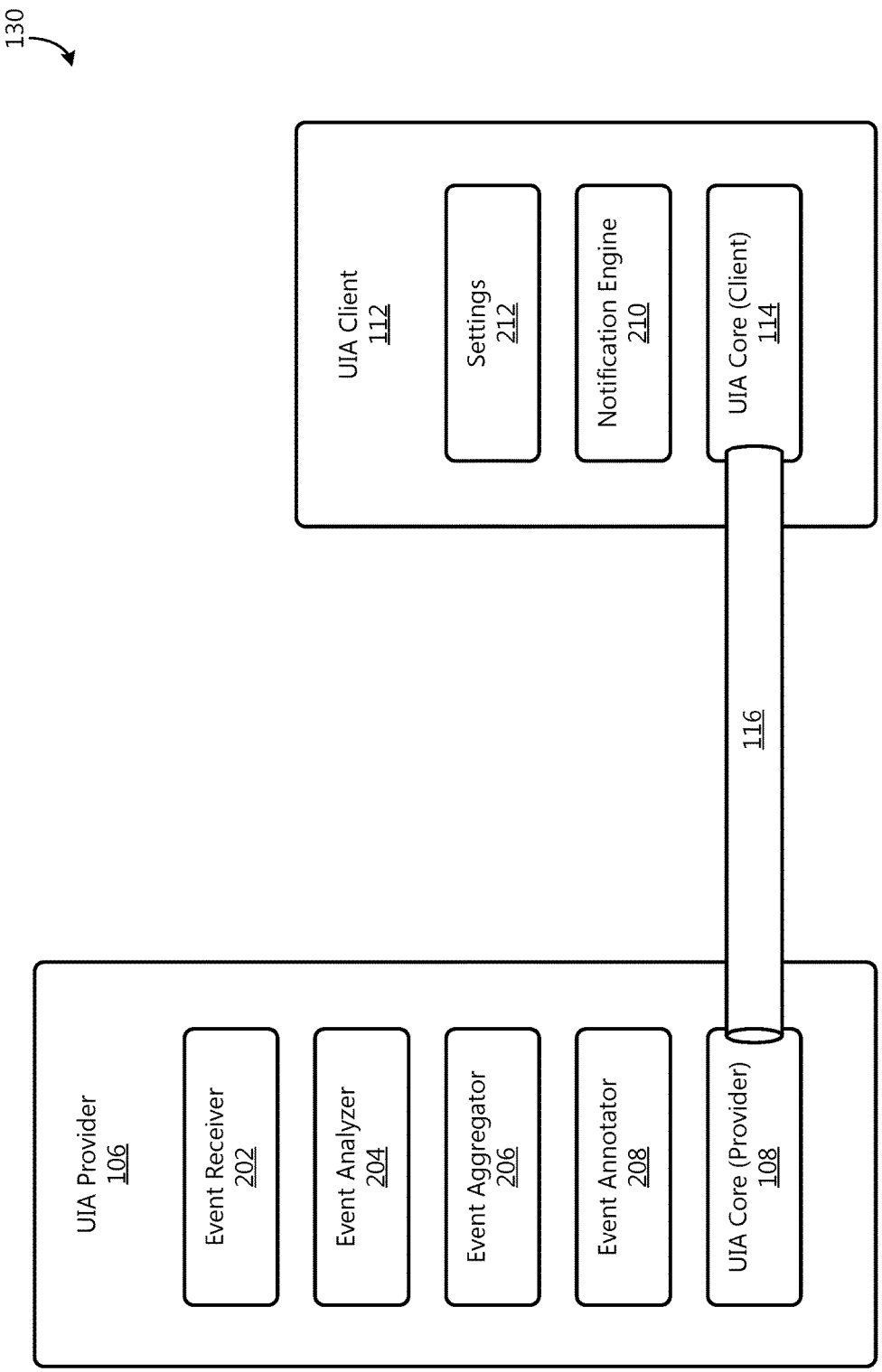

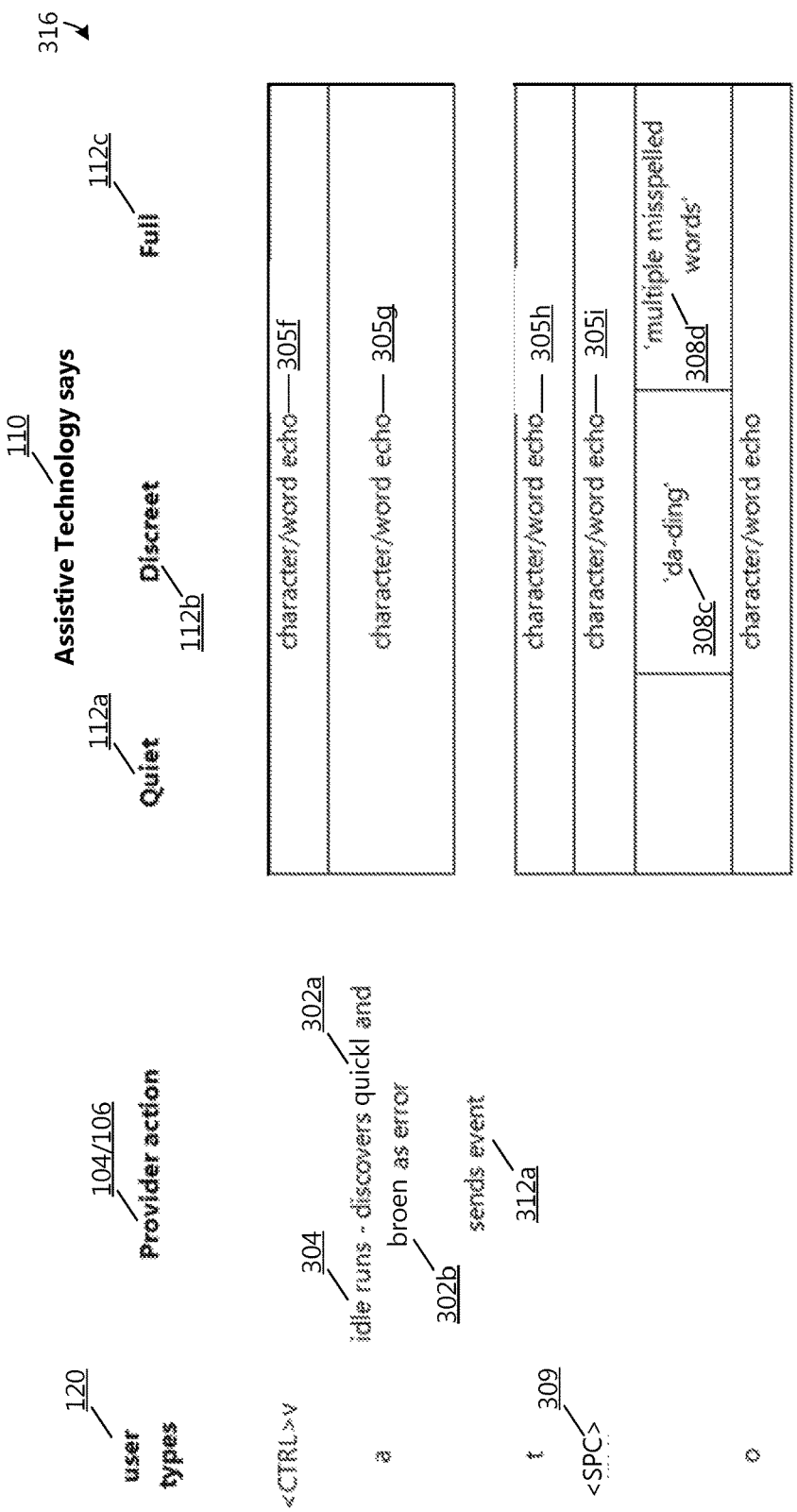

ASSISTIVE TECHNOLOGY NOTIFICATIONS FOR RELEVANT METADATA CHANGES IN A DOCUMENT

BACKGROUND

Assistive technology (AT) products exist to help computer users who may have physical or cognitive difficulties, impairments, or disabilities in areas of learning, communication and access to information contained in and presented by computer software. Assistive technology products can include hardware and software products (e.g., screen readers and voice recognition products) that provide accessibility to computers. For example, a user with vision impairment may utilize a screen reader to help the user to understand and work with software applications, such as a productivity application. The user may utilize the screen reader to assist with authoring a document using a productivity application. For example, the screen reader may echo back recognized text as it appears on the user's screen to help the user to ensure correctness, or may notify the user when certain errors or changes in the document are detected.

User Interface Automation (UIA) provides programmatic access to user interface (UI) elements of a provider application, such as a productivity application, to a client application, such as an assistive technology application. For example, UIA provides programmatic access to text and to metadata about the text, enabling an assistive technology application to read the text and to explore display characteristics associated with the text. Further, UIA supports an event model that allows a provider application to notify a client application when changes occur to a UI element, such as the text. A change may or may not be relevant to the user using assistive technology. As can be appreciated, providing notifications of events that are not relevant to the user can be disruptive to the user.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for notifying an assistive technology user of relevant metadata changes in a document. For example, a signaling system is provided that supports an event model allowing a text providing application to notify an assistive technology application about when relevant changes occur in a document, including changes in the metadata about text, such as detected spelling or grammatical errors, auto-corrections, auto-formatting, co-authoring changes or conflicts, etc.

In some examples, a provider-side signaling system component determines what events may be relevant to the user, packages the event or events, annotates the event or events with semantic information about the event(s), and sends a notification of the event(s) to a client-side signaling system component. The client-side signaling system component is enabled to interpret the notification, and notify the AT application of the event(s) for alerting the user in a relevant and meaningful way.

By enabling productivity applications to provide notifications of relevant changes to an assistive technology application user, improved event notification is provided, thus improving user efficiency in using assistive technology for authoring a document. For example, the user is able to be informed of and react to event notifications without being distracted by notifications that are not relevant to the user.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2 is a simplified block diagram showing various components of an example signaling system;

FIGS. 3A-3E are illustrations showing example assistive technology application behaviors for detected spelling events;

DETAILED DESCRIPTION

Figure 1:
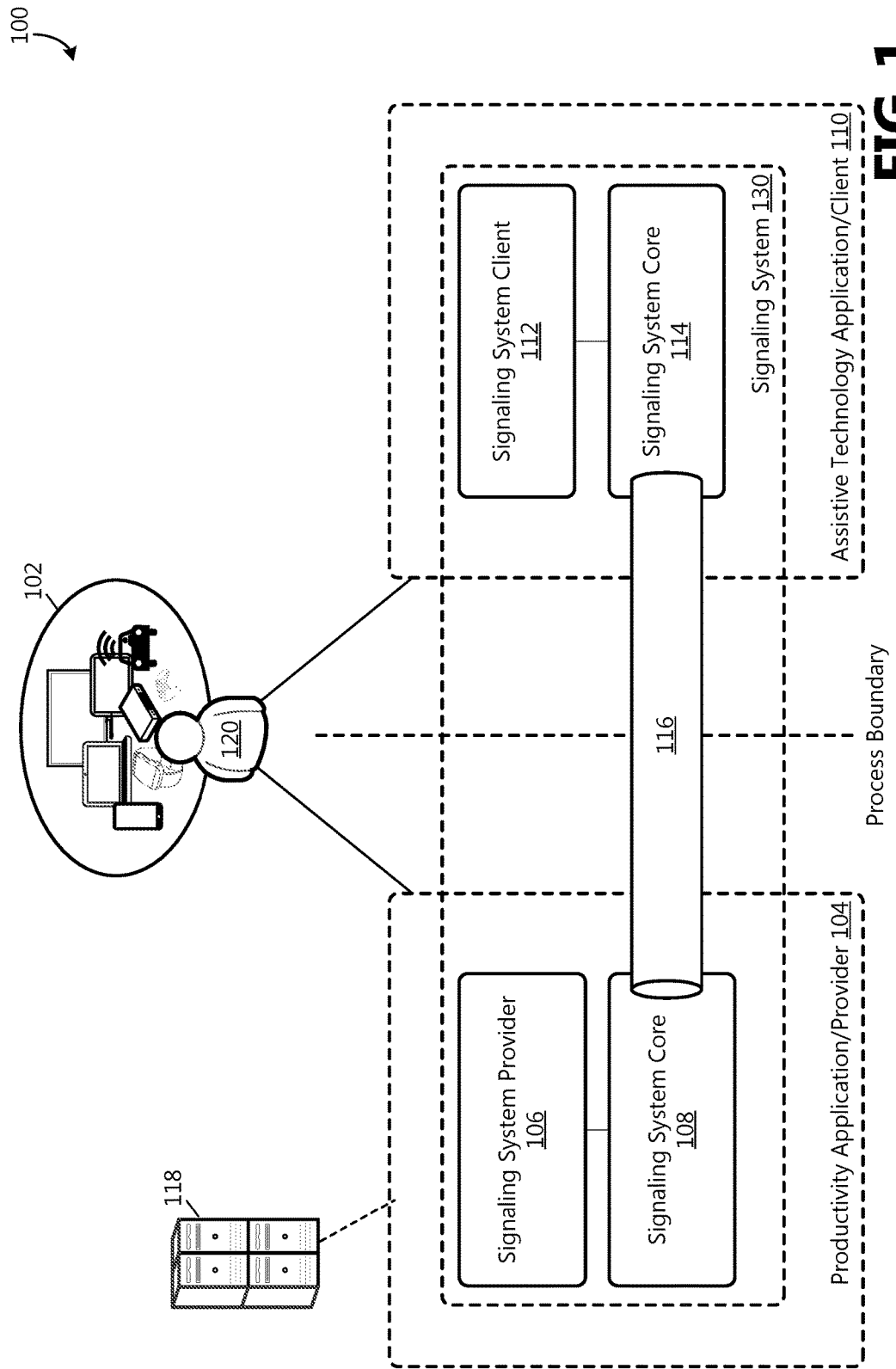
FIG. 1 is a simplified block diagram showing an example signaling system operating environment.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for notifying an AT user of relevant metadata changes in a document. With reference now to FIG. 1, a simplified block diagram illustrating aspects of an example signaling system operating environment 100 is shown. The example signaling system operating environment 100 includes a computing device 102, wherein the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications for performing a variety of tasks.

A user 120 of the computing device 102 may have an impairment or disability that limits the user's ability to interact with the computing device. Accordingly, assistive technology applications 110 are provided to help such users to interact with other applications executing on the computing device 102. The signaling system operating environment 100 includes a signaling system 130. In various examples, the signaling system 130 is represented as a UI Automation system, which provides application programming interfaces (APIs) for providing programmatic access to UI elements of one application to another application, such as an assistive technology application 110, and UI Automation/signaling system core components 108,114. The signaling system 130 handles communication between providers and clients. According to examples, the UI Automation API and UI Automation/signaling system core 108,114 are divided into two parts: one part that is used by a signaling system/UI automation provider application (e.g., productivity application 104), and one part that is used by a signaling system/UI automation client application (assistive technology application 110). The provider side API, herein referred to as the signaling system provider 106, enables developers of control frameworks to expose controls to the signaling system and make them visible to client applications. The provider side UI Automation/signaling system core 108 passes automation data over a named pipe 116 or other interprocess communication medium to the client side signaling system core 114. The client side API, herein referred to as the signaling system client 112, enables the client application to interact with controls in other applications (e.g., productivity application 104), and retrieve information about them.

According to an aspect, the signaling system operating environment 100 includes an assistive technology (AT) application 110 operative to access, identify, or manipulate user interface (UI) elements of a providing application, such as a productivity application 104. According to examples, the AT application 110 (e.g., a screen reader, screen magnifier), is designed to help users with disabilities to use the computing device 102 more effectively. For example, if a user 120 has a vision impairment, the user may utilize a screen reader to assist with authoring a document using a productivity application 104. The screen reader may echo back recognized text as it appears on the user's screen to help the user to ensure correctness, or may notify the user when certain errors or changes in the document are detected.

According to an aspect, the signaling system operating environment 100 includes at least one productivity application 104. A user 120 may utilize a productivity application 104 on a computing device 102 for a variety of tasks, which may include, for example, to write, calculate, draw, organize, prepare and view presentations, send and receive electronic mail, take and organize notes, make music, and the like. For example, the application may be a word processing application, a spreadsheet application, a slide presentation application, a drawings application, an email application, etc. Applications may include thick client applications, which may be stored locally on the computing device 102, or may include thin client applications (i.e., web applications) that may reside on a remote server 118 and accessible over a network or combination of networks (e.g., the Internet, wide area networks, local area networks). A thin client application may be hosted in a browser-controlled environment or coded in a browser-supported language and reliant on a common web browser to render the application executable on a computing device 102.

According to an aspect, the productivity application 104 is operative to generate and provide a UI via which the user 120 is enabled to interact with the application. For example, application content (e.g., document, application controls, graphical icons and visual indicators) is included in the UI, which is generated and displayed on a screen, which is part of or communicatively attached to the computing device 102. When the user 120 utilizes an AT application 110, such as a screen reader, the productivity application 104 is operative to expose information about its UI with the AT application.

The productivity application 104 is operative to communicate with clients (e.g., AT application 110) by sending event notifications and responding to client requests for access to UI elements. In various examples, the signaling system client 112 tracks events that are raised by the signaling system provider 106 when something happens in the UI, and uses the information to notify end users 120. Efficiency is improved by allowing provider applications 104 to raise events selectively, depending on whether the client is subscribed to those events, or not at all if the client is not listening for any events.

According to an aspect, a genericized event type is provided that enables the client (AT application 110) to subscribe to the genericized event type for receiving notifications of multiple changes. In one example, the notification associated with the genericized vent type is consistent with other signaling system events that the signaling system provider 106 passes in. When the event fires, the signaling system client 112 is operative to call a method to handle the event. The client is further enabled to make notification decisions based on a group of events.

Aspects of the present disclosure enable the signaling system provider 106 to notify the signaling system client 112 of changes in the metadata about text, for example, changes to attributes, such as formatting, and changes to annotations, such as spelling errors, grammatical errors, etc. In some cases, for example when a word processing application 104 converts text into a bulleted list, a number of text attributes are changed at the same time. According to an aspect, the signaling system provider 106 is operative to globally aggregate a plurality of changes, annotate the changes, and package the event notifications with the annotation, rather than enumerate the specific changes and require the AT application 110 or the user 120 to infer what happened. Accordingly, when one or more changes to attributes occur within a text range, the signaling system provider 106 is enabled to fire the genericized event, wherein the event carries a payload comprising an identifier for the event type, and a string with additional details for the attribute(s) that changed, which the AT application 110 can use to indicate the metadata properties that changed. In some examples, the signaling system client 112 also receives a pointer to a provider which sent the event.

With reference now to FIG. 2, a simplified block diagram showing various components of the signaling system 130 is illustrated. According to an aspect, the signaling system provider 106 comprises an event receiver 202 operative to receive a notification from the productivity application 104 of a UI event. The UI event may include an event associated with a change to an attribute on a text range, such as a formatting change, a style change, or a property change, or a change to an annotation, such as a spelling error, grammatical error, etc. According to an example, the UI event may or may not be an event for which the client (AT application 110) has registered to receive notifications.

The event receiver 202 is operative to receive one or more notifications of UI events, for example, notifications of UI events associated with a plurality of spelling or grammatical errors, formatting of a plurality of lines of text to a bulleted list, conversion of a predefined sequence of characters into a symbol, etc. In some examples, the productivity application 104 is operative to scan an open document for spelling errors or grammatical errors during idle periods of the application. In some examples, upon detection of an error, the application may transform a display of a portion of text (e.g., word, sentence) within the UI from a first state, where the portion of text is plainly displayed, to a second state, where the portion of text is displayed with a UI marker. According to examples, the UI marker provides a visual indication of an error, such as a squiggly line of a specific color displayed below the portion of text.

In other examples, upon detection of an error, the application may automatically correct the error. Automatic corrections may be based on user or default settings. According to an example, a change in the UI may be caused by user input or programmatic activity. When a change is identified (e.g., an error is detected, an auto-correction or auto-formatting change is made, a formatting change is made by the user 120), the productivity application 104 is operative to raise a change event associated with the identified change, thus notifying the signaling system provider 106 of the change.

According to an aspect, the signaling system provider 106 comprises an event analyzer 204 operative to determine whether the one or more UI events in the received notification(s) are relevant to the client, and filter out events that are determined to not be relevant to the user 120. In some examples, the event analyzer 204 is operative to filter out events based on whether the client (AT application 110) is registered for the event type. For example, the client may not be registered to receive notifications for grammatical errors.

In some examples, the event analyzer 204 is operative to filter out events based on a distance of the event from the user's focus. For example, oftentimes, the application 104 may not notify the signaling system provider 106 immediately after a user's action. For example, there might be some delay, such as when a spellcheck engine or the like performs proofing processes during an idle time of the system, wherein idle time comprises time when the user 120 is not entering data or activating any commands of the productivity application 104. Accordingly, the text or element associated with the event (e.g., spelling error, grammatical error, auto-correction, auto-formatting) may be several words or lines from where the user's current focus or insertion point is.

As another example, when a document is opened in the productivity application 104, the spellcheck engine or other proofing engine may not run until, for example, thirty seconds after the document is opened. The spellcheck engine may identify various misspellings throughout the document, and notify the signaling system provider 106 of the misspelling events. As another example, in a coauthoring environment, where more than one user is modifying a document at the same time, an event may be raised by the productivity application 104 when another individual is modifying a same paragraph where the user's insertion point is, or when another individual is making multiple changes to the document.

According to an aspect, when the signaling system provider 106 receives notification of the event(s), the event analyzer 204 analyzes the event(s), and determines whether the one or more events may be meaningful to the user 120 given the user's current context. For example, the event analyzer 204 may identify how far an event (e.g., misspelling, grammatical error) is from the user's current insertion point, and make a determination as to whether the event is relevant to the user 120, or whether notifying the user of the event would likely be disruptive to the user.

According to one example, the event analyzer 204 makes a determination to alert the user 120 when a specific event occurs within a predefined distance from the user's current position. For example, the event analyzer 204 may determine to alert the user 120 when a spelling or grammatical error is near the user's insertion point (e.g., within a current sentence, within two lines, within 5 words). According to another example, the event analyzer 204 may make a determination to raise a certain type of event regardless of the distance from the user's current position. For example, the event analyzer 204 may determine to alert the user 120 when a plurality of lines of text is converted to a bulleted list, even when the user's insertion point is farther than a given distance from the location of the event, or to alert the user when a co-author is making certain modifications to the document or a predetermined number of modifications to the document, etc.

According to an aspect, the signaling system provider 106 comprises an event aggregator 206 operative to aggregate a plurality of events about which to alert the user 120. In some examples, the event aggregator 206 aggregates related events. For example, if the productivity application 104 detects that the user 120 is entering a numbered list, it may change a number of attributes all at once, such as: indentions to list items; a deletion of a number 1; and auto-numerals to list items. According to an aspect, the event aggregator 206 aggregates events for advantageously providing a batch of related events (i.e., collective event) in a single transaction rather than in multiple transactions. As can be appreciated, notifying the client of a plurality of events in a single transaction reduces a number of processing steps required by the signaling system 130.

According to an aspect, the signaling system provider 106 further comprises an event annotator 208 operative to generate a string describing the one or more change events from the productivity application 104 point of view. For example, the event annotator 208 summarizes what has changed in a localized string such that the string includes details associated with changed attributes. When notifying the client of a single event, the event annotator 208 is operative to generate a string describing the single event. For example, if a word (e.g., "this") is capitalized, the event annotator 208 may generate a string such as, "'this' capitalized."

Consider, for example, that the user 120 is adding textual content to a document, and includes an asterisk and a space ("*") followed by text. The productivity application 104 is operative to identify that the user is starting a bulleted list. Accordingly, the application may auto-format the identified list, and change a number of attributes, such as change the asterisk to a Unicode bullet symbol, indent the list, etc. As described above, the event aggregator 206 packages up the individual formatting concepts as individual events packaged inside a collective event, and the event annotator 208 generates a string that describes the collective event. For example, the event annotator 208 may generate a string that says, "auto-bulleting applied," when provides semantic understanding to the batched individual changes that were made.

As described above, the signaling system provider 106 includes the provider-side signaling system core 108 operative to pass event notifications to the client-side signaling system core 114 over the named pipe 116. When an event notification includes a collective event, the event carries a payload comprising an identifier for each event type in the collective event and the string generated by the event annotator 208, which the client (AT application 110) is enabled to use to notify the user of a group of changes in the generic sense. According to examples, each individual change aggregated in the collective event has an associated identifier, such as a globally-unique identifier (GUID) that the client is enabled to understand. In one example, when an event notification is for a single event, the event carries a payload comprising the identifier for the event type, and a string describing the event.

As described above, the signaling system client 112 includes the signaling system signaling system core 114 operative to receive the event notification. According to an aspect, the signaling system client 112 further comprises a notification engine 210 that is operative to handle the event for providing a notification to the user 120 of relevant changes. The notification engine 210 is further operative to make a determination as to whether to notify the user of the change(s). Further, if a determination is made to notify the user, the notification engine 210 is operative to make a determination as to how to notify the user 120. According to an aspect, the determinations are based on a current task and on verbosity settings 212 of the AT application 110. For example, the verbosity settings 212 may be associated with a notification mode of the AT application 110, and may be set by the user 120, or may be default settings of the application. The notification engine 210 is further operative to determine an appropriate alert or construct an appropriate announcement string based on the current task and on verbosity settings 212. According to an aspect, the notification engine 210 is further operative to provide the alert or announcement string to the AT application 110, such that the application is enabled to render the string or play the alert or announcement.

In one example, a first verbosity setting 212 includes a quiet setting, where no indications of errors are provided while the user 120 is typing or during a copy/paste operation. For example, in the quiet setting, events may be ignored. According to an example, the user 120 is enabled to issue a command, such as "read spelling," to instruct the AT application 110 to check for spelling errors. For example, the user 120 may instruct the AT application 110 to check for spelling errors when the user is not typing.

In another example, a second verbosity setting 212 includes a discreet setting, where, while the user is typing or during a copy/paste operation, an audible alert is played when a single error, multiple errors, an auto-correction change, an auto-formatting change, or a coauthor change is detected. For example, the audible alert informs the user 120 that something has happened within a predetermined area of the user's current focus. For example, the user 120 may be alerted that a change happened in the paragraph where the user is currently working. Accordingly, the user is enabled to later check what the change associated with the alert is. In some examples, the user 120 is enabled to enter a command to instruct the AT application 110 to search back to a nearest range with an error, auto-correction, auto-formatting, or coauthoring change annotation.

According to an example, the audible alert may vary depending on the type of event. For example, a simple "ding" may be played when an idle loop (of the productivity application 104) detects a single error. As another example, a double "da-ding" may be played when multiple errors are detected. As another example, other alert sounds may be paired with an auto correction change, an auto formatting change, or a coauthor change. According to an example, the sound of the audible alert is in a different register from a selected narration voice, such that the alert can be mixed with the voice without obscuring it. That is, a parallel audio channel is enabled to play an audible alert over text narration/echoing. In some examples, the audible alert is delayed to play after the user 120 types a next word-break-opportunity character, such as a space. As should be appreciated, the audible alerts described herein are for exemplary purposes only, for example, to illustrate variations in alerts depending on a type of event/metadata change.

In another example, a second verbosity setting 212 includes a verbose setting, where, during typing, the AT application 110 announces the error, auto correction change, auto formatting change, or coauthor change associated with the event. In one example, when a single error or change is detected, which includes a collective event, the AT application 110 may announce the word and class of error/change, for example, "misspelled word 'hellop'," "repeated word 'very'," "missing period on abbreviation 'etc'," "converted to bulleted list," or "auto capitalized beginning of sentence." In another example, when more than one error or change is detected, the AT application 110 may announce, "multiple proofing issues found." In some examples, the announcement is played after the user 120 types a next 'word break opportunity' character.

Figure 3A:
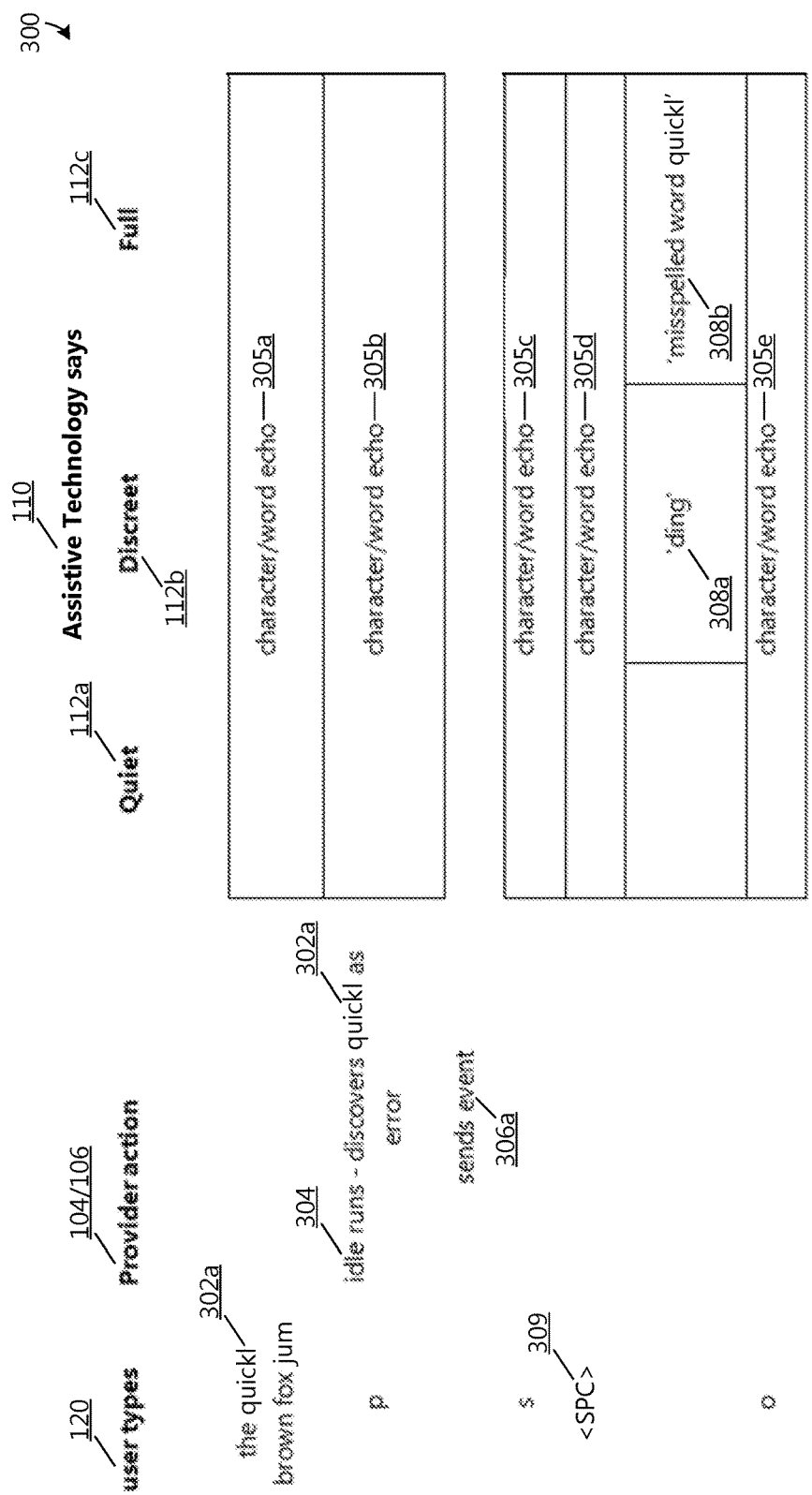

FIGS. 3A-3E illustrate various examples of AT application behaviors for detected spelling events. With reference now to FIG. 3A, in a first example 300, the user 120 makes a single typing (spelling) error 302a. The idle loop 304 detects the spelling error 302a at a later point in time, for example, after the user 120 has typed a number of other words. As illustrated, the AT application 110 provides a first echo 305a (e.g., character or word echo) of a first portion of text, for example, the portion entered until the idle loop 304 runs. The AT application 110 continues to provide a second echo 305b of a next entered character. As illustrated, the signaling system provider 106 sends an event 306a associated with the detected spelling error 302a. The AT application 110 continues to provide a third echo 305c of a next entered character, and a fourth echo 305d of an entered space 309. According to an example, the AT application 110 alerts the user 120 upon detection of the space 309 or other word-breaking opportunity character.

In response to receiving the event 306a, the client (AT application 110) may handle the event by alerting the user 120 based on verbosity settings 212. For example: at a quiet setting 212a, the AT application 110 may not provide an alert; at a discreet setting 212b, the AT application 110 may provide an audible alert 308a, such as a "ding," to notify the user 120 that an error 302a was detected; and at a full setting 212c, the AT application 110 may provide an audible announcement 308b, such as "misspelled work quickl," to notify the user 120 that an error 302a was detected and what the detected error is.

Figure 3B:
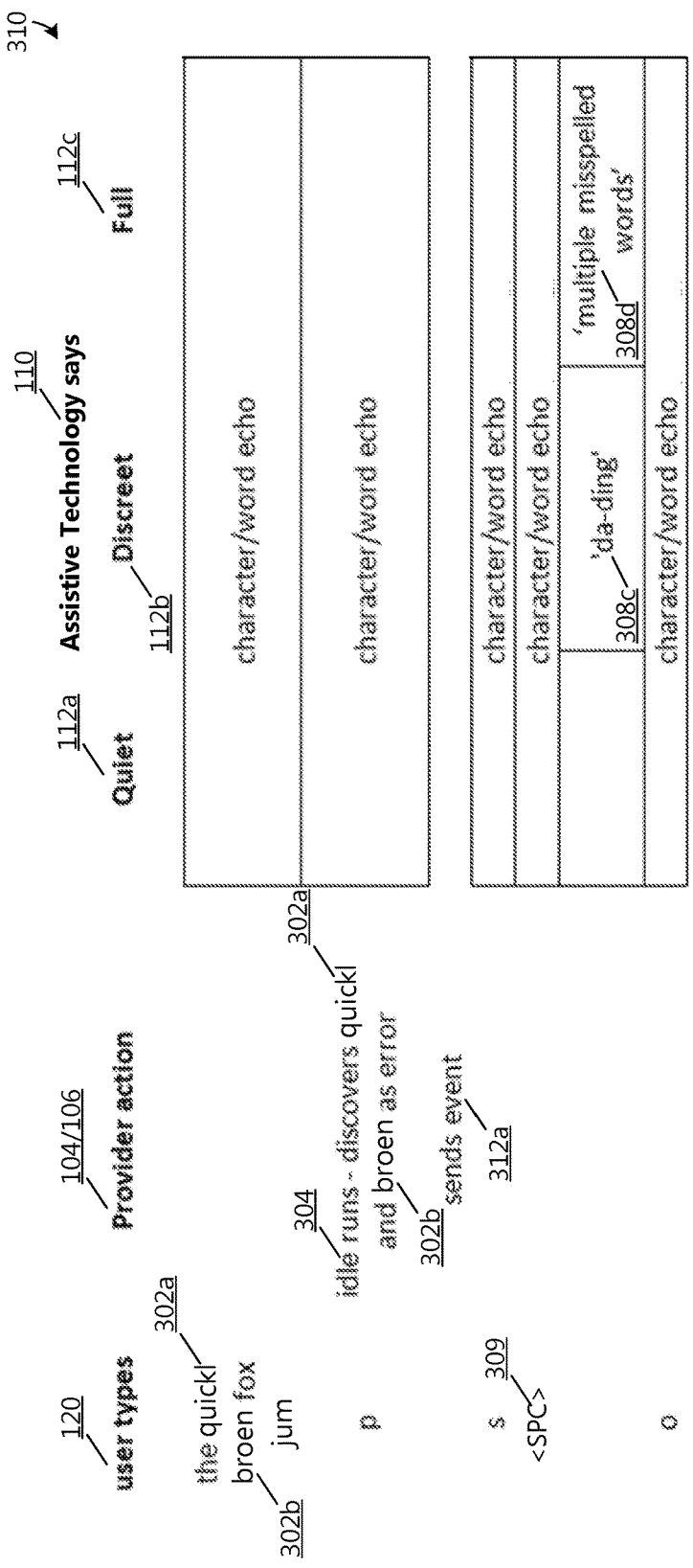

With reference now to FIG. 3B, in a second example 310, the user 120 makes a plurality of typing (spelling) errors 302a,302b. For example, in the illustrated example 310, the user 120 has typed two words that are not in a dictionary, which are found in a pass of the idle loop 304 (e.g., by the productivity application 104), and are aggregated together into one collective event 312a (e.g. by the event aggregator 206 of the signaling system provider 106). As illustrated, the signaling system provider 106 sends the collective event 312a associated with the two detected spelling errors 302a, 302b. Also as illustrated, upon detection of a space 309 or other word-breaking opportunity character, the AT application 110 alerts the user 120.

In response to receiving the collective event 312a, the client (AT application 110) may handle the event by alerting the user 120 based on verbosity settings 212. For example: at a quiet setting 212a, the AT application 110 may not provide an alert; at a discreet setting 212b, the AT application 110 may provide an audible alert 308c, such as a "da-ding," to notify the user 120 that errors 302a,302b were detected; and at a full setting 212c, the AT application 110 may provide an audible announcement 308d, such as "multiple misspelled words," to notify the user 120 that errors 302a,302b were detected and a summary of what the detected errors are. According to an aspect, the summary string is generated by the event annotator 208, and passed with the collective event 312a to the signaling system client 112.

Figure 3C:
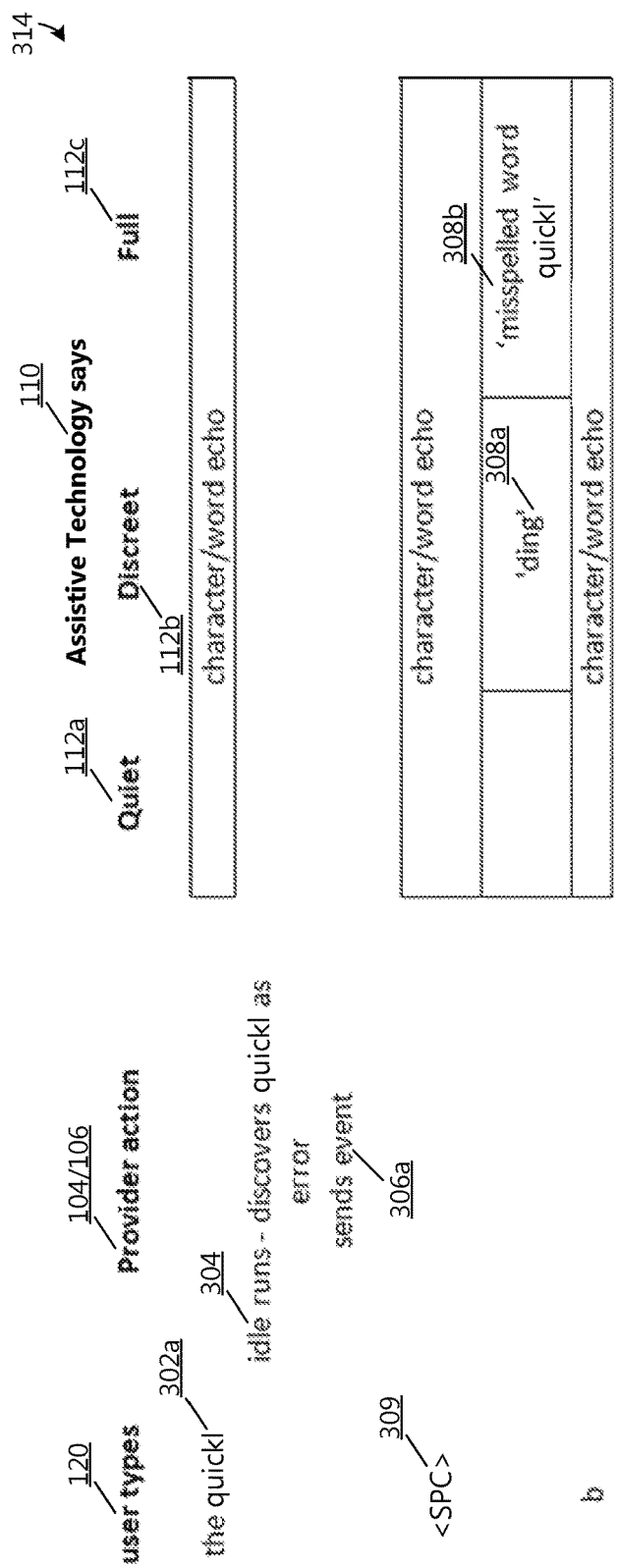

With reference now to FIG. 3C, in a third example 314, the user 120 makes a single typing (spelling) error 302a. The idle loop 304 runs for the last word (e.g., "quick") before the user types the next word (e.g., "brown"). For example, the idle loop 304 detects the spelling error 302a while the user is still typing the word. As illustrated, the signaling system provider 106 sends an event 306a associated with the detected spelling error 302a, and the assistive technology application 110 alerts the user 120 upon detection of a space 309 or other word-breaking opportunity character.

In response to receiving the event 306a, the client (AT application 110) may handle the event by alerting the user 120 based on verbosity settings 212. For example: at a quiet setting 212a, the AT application 110 may not provide an alert; at a discreet setting 212b, the AT application 110 may provide an audible alert 308a, such as a "ding," to notify the user 120 that an error 302a was detected; and at a full setting 212c, the AT application 110 may provide an audible announcement 308b, such as "misspelled work quickl," to notify the user 120 that an error 302a was detected and what the detected error is.

With reference now to FIG. 3D, in a fourth example 316, the user 120 pastes a selection comprising a plurality of typing (spelling) errors 302a,302b. For example, in the illustrated example 310, the user 120 has pasted a selection of text including two words that are not in a dictionary. As illustrated, the AT application 110 provides a first echo 305f echoing the pasted text. The idle loop 304 runs as the user 120 is typing a new word, and finds the errors 302a,302b. The errors 302a,302b are aggregated together into one collective event 312a (e.g. by the event aggregator 206 of the signaling system provider 106). The AT application 110 continues to provide a second echo 305g echoing a next entered character. The signaling system provider 106 sends the collective event 312a associated with the two detected spelling errors 302a,302b to the signaling system client 112. The AT application 110 continues to provide a third echo 305h echoing a next entered character, and a fourth echo 305i echoing an entered space 309. According to an example, the AT application 110 alerts the user 120 upon detection of the space 309 or other word-breaking opportunity character.

In response to receiving the collective event 312a, the client (AT application 110) may handle the event by alerting the user 120 based on verbosity settings 212. For example: at a quiet setting 212a, the AT application 110 may not provide an alert; at a discreet setting 212b, the AT application 110 may provide an audible alert 308c, such as a "da-ding," to notify the user 120 that errors 302a,302b were detected; and at a full setting 212c, the AT application 110 may provide an audible announcement 308d, such as "multiple misspelled words," to notify the user 120 that errors 302a,302b were detected and a summary of what the detected errors are. According to an aspect, the summary string is generated by the event annotator 208, and passed with the collective event 312a to the signaling system client 112.

Figure 3E:
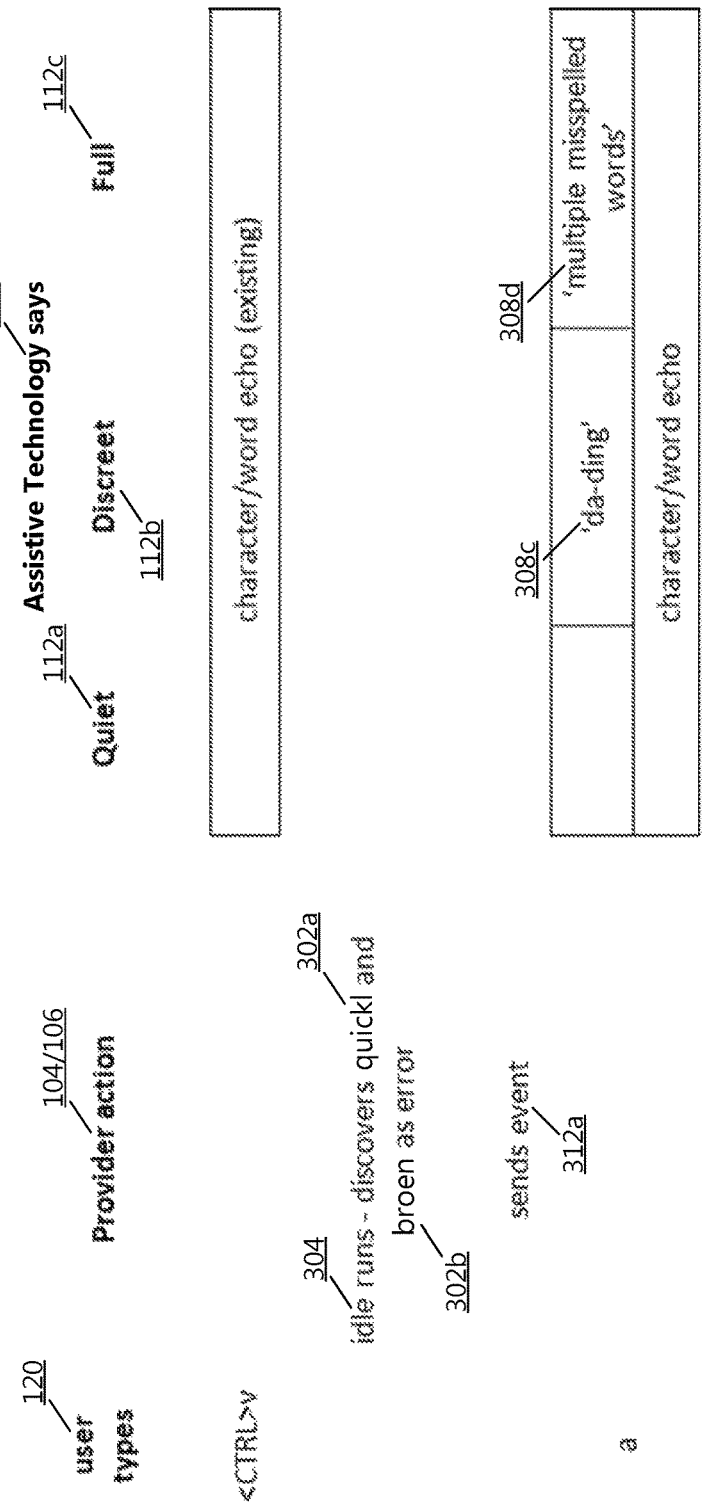

With reference now to FIG. 3E, in a fifth example 318, like in the fourth example 316 illustrated in FIG. 3D, the user 120 pastes a selection comprising a plurality of typing (spelling) errors 302a,302b. However in the fifth example 318, the user 120 is not typing a new word. Accordingly, the idle loop 304 runs after the selection is pasted to the document, and the errors 302a,302b are discovered and aggregated together into one collective event 312a. The signaling system provider 106 sends the collective event 312a associated with the two detected spelling errors 302a, 302b to the signaling system client 112.

In response to receiving the collective event 312a, the client (AT application 110) may handle the event by alerting the user 120 based on verbosity settings 212. For example: at a quiet setting 212a, the AT application 110 may not provide an alert; at a discreet setting 212b, the AT application 110 may provide an audible alert 308c, such as a "da-ding," to notify the user 120 that errors 302a,302b were detected; and at a full setting 212c, the AT application 110 may provide an audible announcement 308d, such as "multiple misspelled words," to notify the user 120 that errors 302a,302b were detected and a summary of what the detected errors are. According to an aspect, the summary string is generated by the event annotator 208, and passed with the collective event 312a to the signaling system client 112.

Figure 3F:
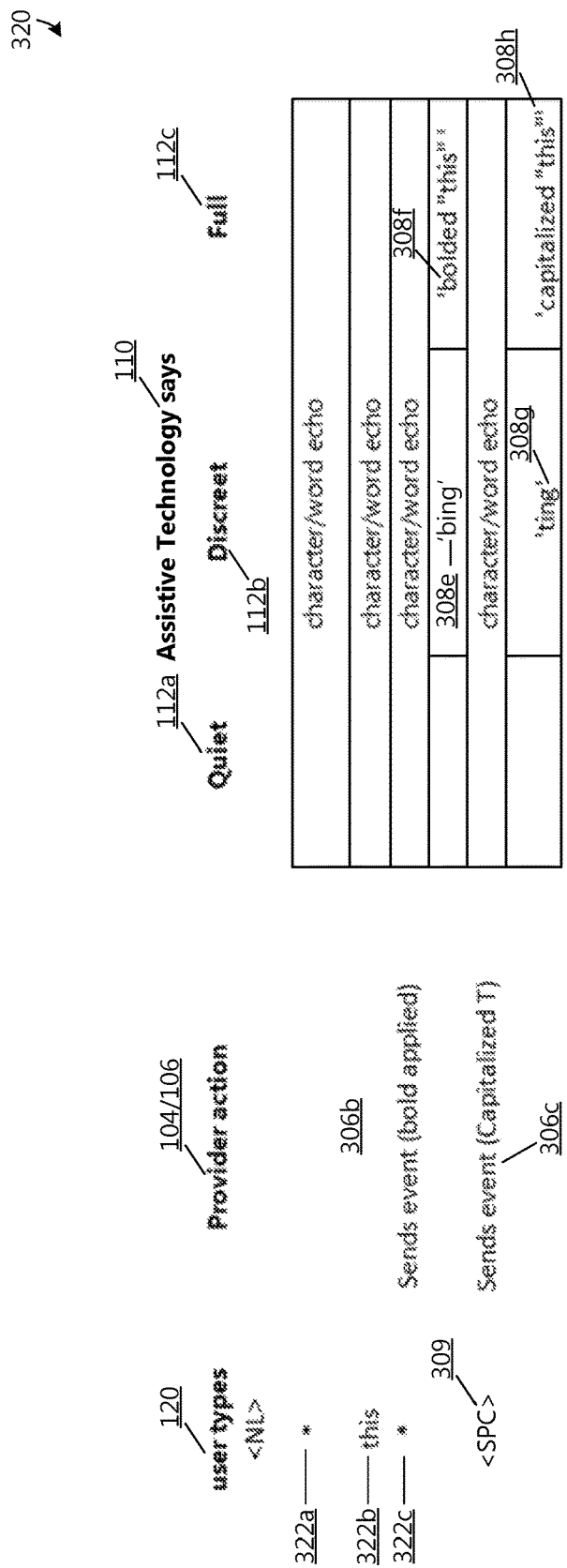
FIGS. 3F-3G are illustrations showing example assistive technology application behaviors for detected auto-formatting events.
Figure 3G:
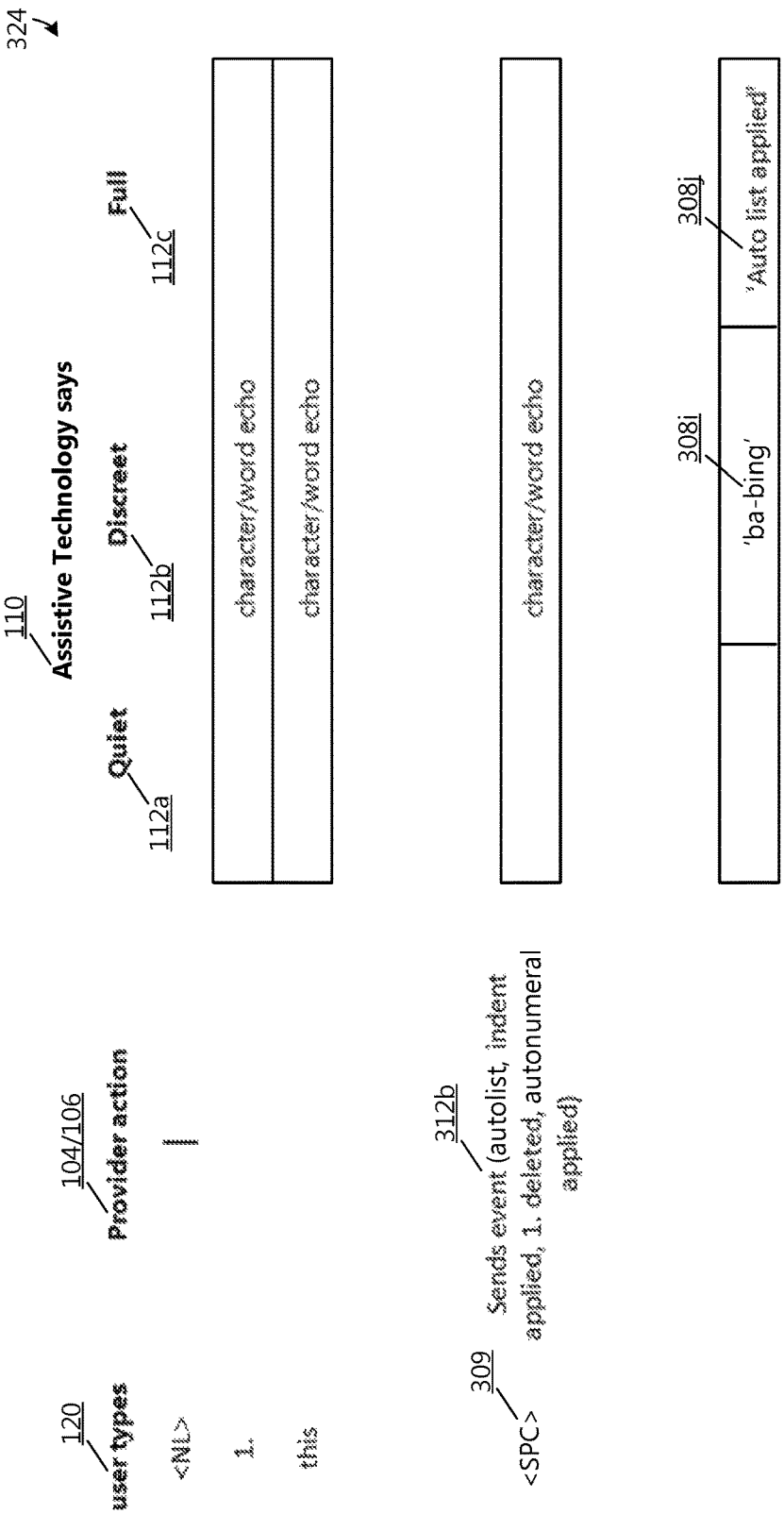

FIGS. 3F-3G illustrate various examples of AT application behaviors for detected auto-formatting events. With reference now to FIG. 3F, in a sixth example 320, the user 120 starts a new line, and enters a first asterisk 222a, followed by a word 222b, followed by a second asterisk 222c, which, according to an aspect, is a shortcut command for "turning on" a bold character attribute. Accordingly, the productivity application 104 converts the entered characters ("*this*") into bold-formatted text.

As illustrated, the signaling system provider 106 sends an event 306b associated with the auto-formatting. In response, the AT application 110 handles event 306b by alerting the user 120 based on verbosity settings 212. For example: at a quiet setting 212a, the AT application 110 may not provide an alert; at a discreet setting 212b, the AT application 110 may provide an audible alert 308e, such as a "bing," to notify the user 120 that an attribute was auto-formatted; and at a full setting 212c, the AT application 110 may provide an audible announcement 308f, such as "bolded 'this'," to notify the user 120 of the auto-formatting event and information about what was formatted and how it was formatted.

Further, as illustrated, the productivity application 104 automatically capitalizes the first letter of the word "this" For example, the productivity application 104 may perform the auto-formatting of the bold attribute and the auto-correction of the capital "T" in two separate processes.

Accordingly, the signaling system provider 106 sends another event 306c associated with the auto-correction.

In response, the AT application 110 handles the event 306c by alerting the user 120 based on verbosity settings 212. For example: at a quiet setting 212a, the AT application 110 may not provide an alert; at a discreet setting 212b, the AT application 110 may provide an audible alert 308g, such as a "ting," to notify the user 120 that an attribute was auto-corrected; and at a full setting 212c, the AT application 110 may provide an audible announcement 308h, such as "capitalized 'this'," to notify the user 120 of the auto-correction event and information about what was corrected and how it was corrected.

With reference now to FIG. 3G, in a seventh example 324, the user 120 starts a new line, and enters the number one ("1"), followed by a period ("."), followed by text ("this"), followed by a space (<SPC>), which, according to an aspect, is a shortcut command for formatting the entered text into a numbered list. Accordingly, the productivity application 104 converts the entered characters ("1.this") into a numbered list. According to examples, automatically converting a selection into a numbered list involves a plurality of related events, such as indenting the list, deleting the number 1, and applying an autonumeral. According to an aspect, the plurality of related events are aggregated together into one collective event 312b (e.g. by the event aggregator 206 of the signaling system provider 106). As illustrated, the signaling system provider 106 sends the collective event 312b associated with the auto-formatting. Also as illustrated, upon detection of a space 309 or other word-breaking opportunity character, the AT application 110 alerts the user 120.

In response to receiving the collective event 312b, the client (AT application 110) handles the event by alerting the user 120 based on verbosity settings 212. For example: at a quiet setting 212a, the AT application 110 may not provide an alert; at a discreet setting 212b, the AT application 110 may provide an audible alert 308i, such as a "ba-bing," to notify the user 120 that auto-formatting was applied; and at a full setting 212c, the AT application 110 may provide an audible announcement 308j, such as "auto list applied," to notify the user 120 that auto-formatting was applied and a generic summary of the plurality of related events comprised in the collective event 312b. According to an aspect, the summary string is generated by the event annotator 208, and passed with the collective event 312b to the signaling system client 112.

Figure 4:
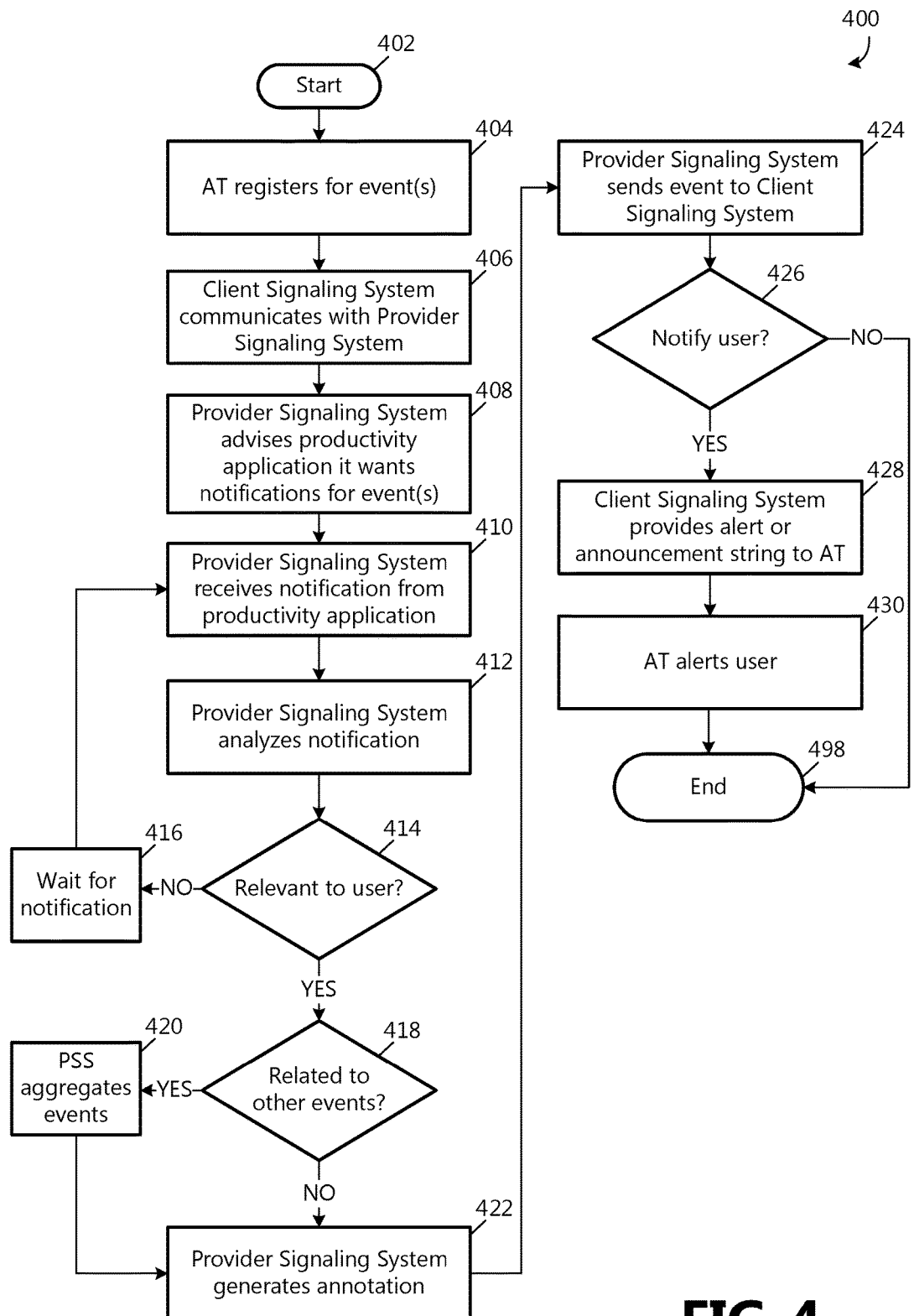
FIG. 4 is a flow chart showing general stages involved in an example method for notifying an AT user of relevant metadata changes in a document.

Having described an operating environment, components of the signaling system, and various AT application behavior examples, FIG. 4 is a flow chart showing general stages involved in an example method 400 for notifying an AT user of relevant metadata changes in a document. The method 400 starts at OPERATION 402, and proceeds to OPERATION 404, where the AT application 110 registers for one or more event types. For example, the AT application 110 registers to receive notifications for certain event types, such as certain attribute or metadata changes.

The method 400 proceeds to OPERATION 406, where the signaling system client 112 communicates the event notification request to the signaling system provider 106. For example, the event notification request is a request to receive notifications of certain event types (e.g., certain attribute or metadata changes). According to an example, the request is sent via the signaling system client 112 to the signaling system provider 106.

At OPERATION 408, the signaling system provider 106 advises the productivity application 104 that it wants notifications for the requested event type(s). The method 400 proceeds to OPERATION 410, where the signaling system provider 106 receives one or more event notifications from the productivity application 104, wherein the one or more event notifications are associated with one or more attribute or metadata changes. In some examples, the productivity application 104 only fires events that the client (AT application 110) has registered for, and does not fire unwanted events.

The method 400 proceeds to OPERATION 412, where the signaling system provider 106 analyzes the event notification(s) for determining whether the event(s) are relevant to the user 120. In some examples, the productivity application 104 fires events that the AT application 110 has not registered for, relying on the signaling system provider 106 to filter out unwanted events. Further, the signaling system provider 106 analyzes the event notification(s) for determining whether an event is relevant to the user 120 based on the type of event and/or the location of the event, for example, whether the location of the event(s) are greater than a predetermined distance from the user's focus (e.g., insertion point, cursor). According to an example, the signaling system provider 106 may filter out events based on the distance of the event from the user's focus. Additionally, certain event types may be determined to be relevant to the user 120 regardless of their location in the document and distance from the user's focus, while other event types may be determined to not be relevant to the user if the event is not within close proximity to the user's focus.

The method 400 proceeds to DECISION OPERATION 414, where a determination is made as to whether the one or more events are relevant to the user 120. When a determination is made that an event is not relevant to the user 120, the method 400 may proceed to OPERATION 416, where event notification may be filtered out, and the signaling system provider 106 waits for another event notification.

When a determination is made that an event is relevant to the user 120, the method 400 may proceed to DECISION OPERATION 418, where a determination is made as to whether a plurality of events are received, and if so, whether the events are related. For example, the productivity application 104 may change a number of attributes all at once for a certain formatting change. When a determination is made that the event notification is for multiple related events, the method 400 proceeds to OPERATION 420, where the signaling system provider 106 aggregates the plurality of related events as a collective event 312.

From OPERATION 420, or when a determination is made that the event is a single event at DECISION OPERATION 418, the method 400 continues to OPERATION 422, where the signaling system provider 106 generates a string describing the one or more events, for example, providing additional details associated with the one or more attribute or metadata changes. For example, when the notification is associated with a plurality of related events, the signaling system provider 106 creates a generalized summary of the changes, rather than a plurality of strings describing each change.

The method 400 proceeds to OPERATION 424, where the signaling system provider 106 sends the event notification comprising a payload comprising the identifier for the event type and a string describing the event(s) to the signaling system client 112. At DECISION OPERATION 426, the signaling system client 112 makes a determination as to whether to notify the user of the received event(s). For example, the determination may be made based on verbosity settings 212 set by the user 120. In some examples, the determination is also made based on a current context of the AT application 110, for example, whether the AT application 110 is current narrating text, or whether it has reached a word-breaking opportunity to unobtrusively alert the user 120 of changes.

When a determination is made to alert the user 120, the method 400 proceeds to OPERATION 428, where the signaling system client 112 provides the event notification to the AT application 110, and provides an indication of how to alert the user (e.g., a discreet alert, a full alert).

The method 400 continues to OPERATION 430, where the AT application 110 alerts the user 120 of the event(s) according to the indication provided by the signaling system client 112. For example, the AT application 110 may provide an audible alert to notify the user 120 that changes were detected, or an audible announcement that provides the user with additional details, such as what the detected changes are. The method 400 ends at OPERATION 498.

According to an aspect, the signaling system 130 enables the client (AT application 110) to register to receive event notifications for spelling or grammatical errors, auto-correction changes, auto-formatting changes, coauthoring changes, or other event-types, eliminating a need for the client continually poll all the UI elements in the system to see if any information, structure, or state has changed, thus reducing processor load of the computing device 102.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
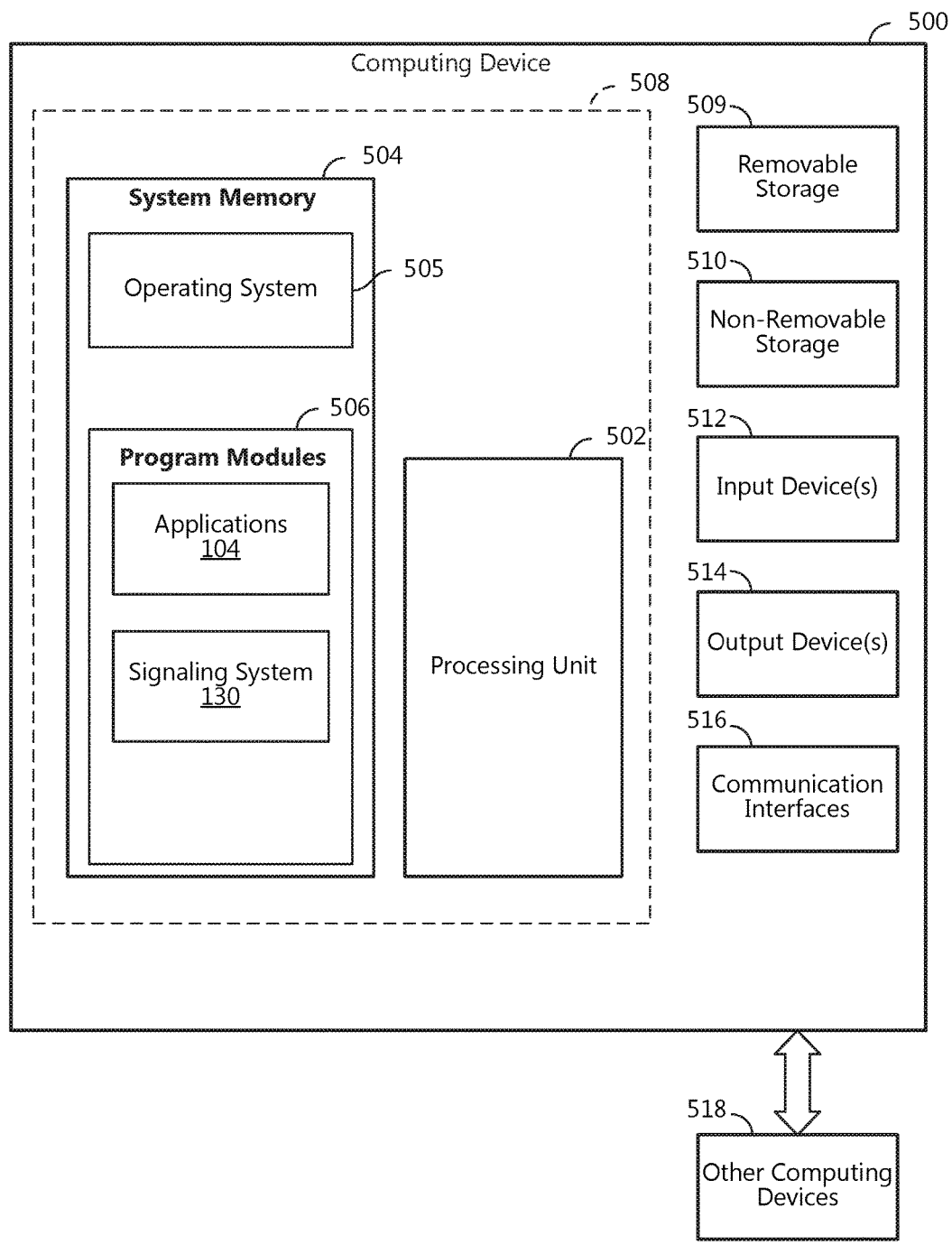
FIG. 5 is a block diagram illustrating example physical components of a computing device.
Figure 6A:
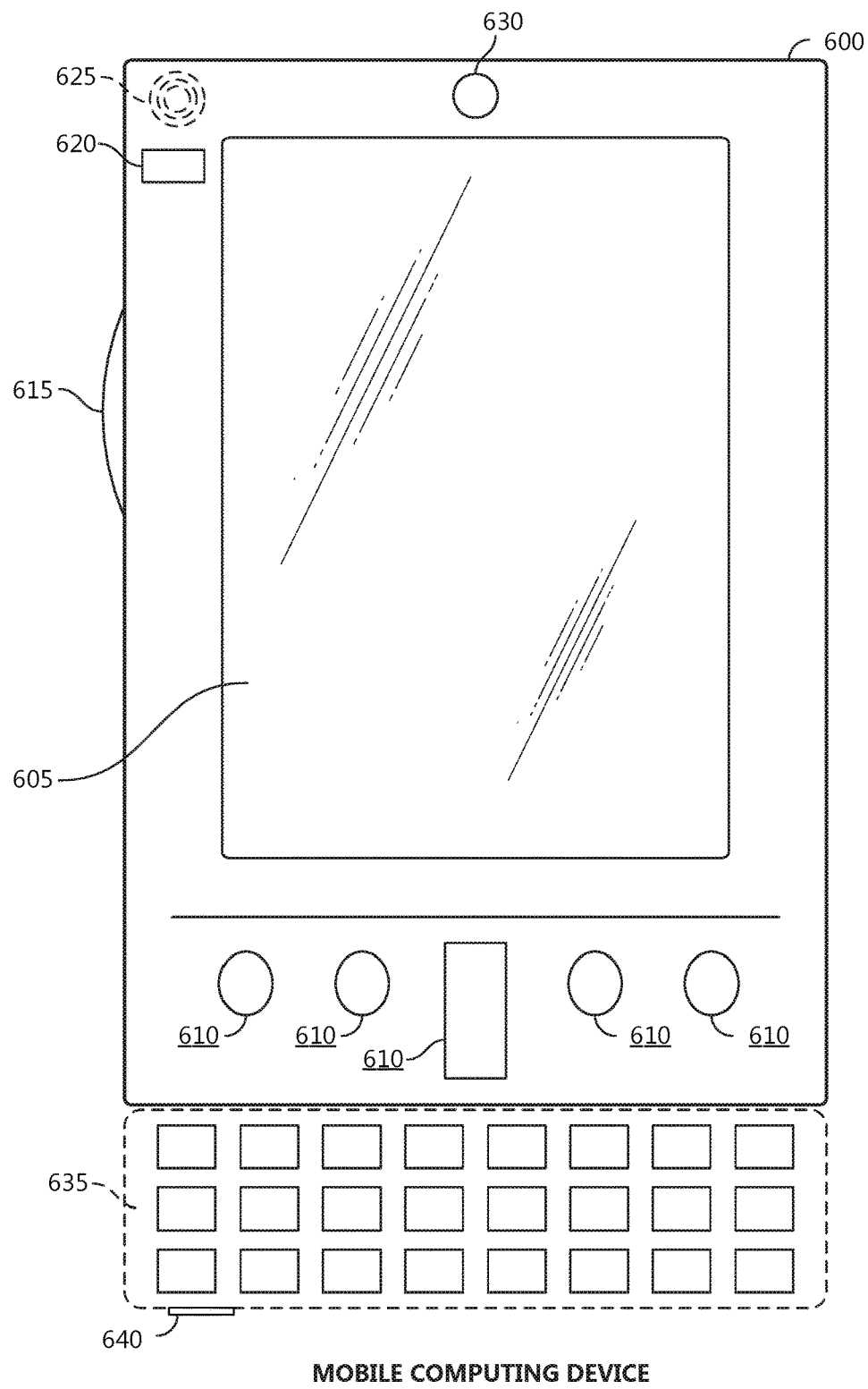
FIGS. 6A and 6B are simplified block diagrams of a mobile computing device.
Figure 6B:
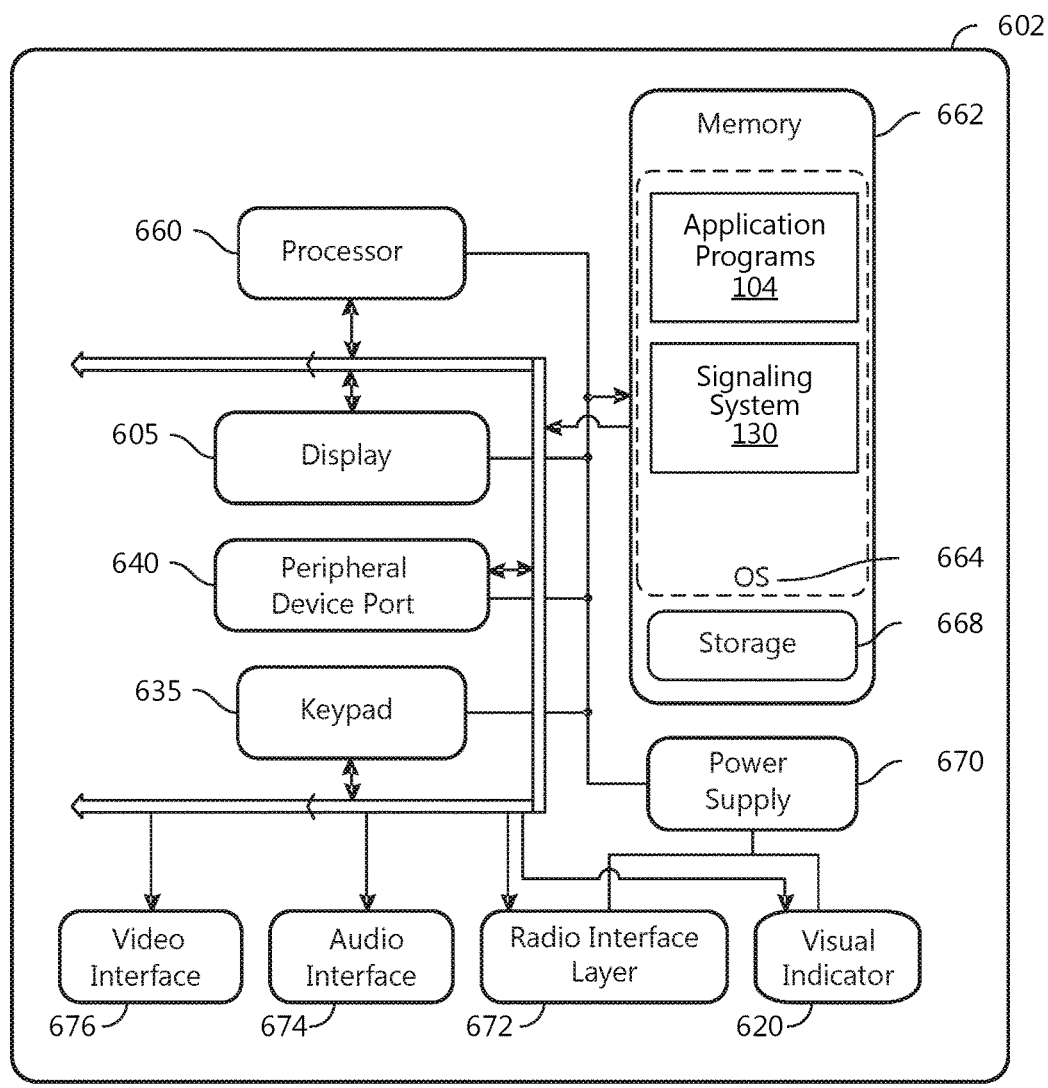
Figure 7:
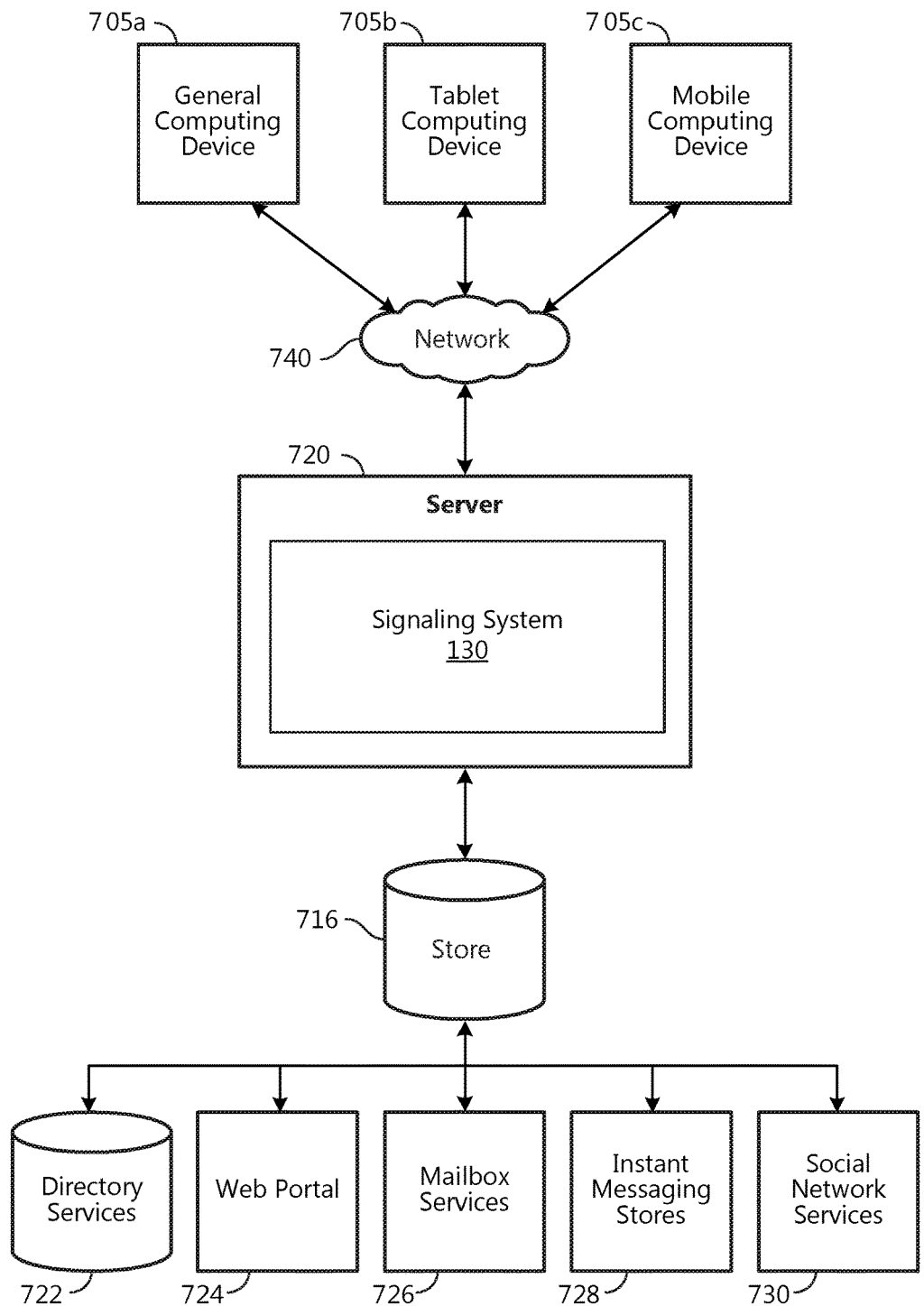
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the signaling system 130. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., signaling system 130) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the signaling system 130 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for notifying an AT user of relevant metadata changes in a document as described above. Content developed, interacted with, or edited in association with the signaling system 130 is enabled to be stored in different communication channels or other storage types. For example, various documents may be stored using a directory service 722, a web portal 724, a mailbox service 726, an instant messaging store 728, or a social networking site 730. The signaling system 130 is operative to use any of these types of systems or the like for notifying an AT user of relevant metadata changes in a document, as described herein. According to an aspect, a server 720 provides the signaling system 130 to clients 705a,b,c. As one example, the server 720 is a web server providing the signaling system 130 over the web. The server 720 provides the signaling system 130 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing a signaling system for notifying a user of an assistive technology (AT) application of metadata changes in a document authored by a productivity application, comprising:
   receiving, at the AT application, an event notification of an attribute change in the document from the productivity application, the attribute change determined by the productivity application to be relevant to the user;
   determining whether to alert the user of the attribute change based on verbosity settings; and
   when a determination is made to alert the user of the attribute change, generating an alert for notifying the user of the attribute change.

2. The computer-implemented method of claim 1, wherein the attribute change is determined to be relevant to the user when a location of the attribute change is within a text range that is considered relevant to the user based on a type of the attribute change.

3. The computer-implemented method of claim 1, further comprising:
   receiving, at the AT application, a string describing the attribute change.

4. The computer-implemented method of claim 3, wherein when the attribute change comprises a plurality of attribute changes:
   the plurality of attribute changes are aggregated; and
   a string describing the plurality of attribute changes is received at the AT application for enabling the AT application to communicate a general summary of the plurality of attribute changes.

5. The computer-implemented method of claim 3, wherein receiving the event notification further comprises receiving a payload with the event notification, the payload comprising:

an identifier for the attribute change; and
the string describing the attribute change.

6. The computer-implemented method of claim 5, wherein determining whether to alert the user of the attribute change based on the verbosity settings comprises determining whether to alert the user of the attribute change based on whether the user has selected one of:
   a quiet verbosity setting;
   a discreet verbosity setting; and
   a full verbosity setting.

7. The computer-implemented method of claim 6, wherein when the quiet verbosity setting is selected, making a determination to not alert the user of the attribute change.

8. The computer-implemented method of claim 6, wherein when the discreet verbosity setting is selected, making a determination to provide an audible alert based on a type of attribute change on a parallel audio channel mixed over text narration by the AT application.

9. The computer-implemented method of claim 6, wherein when the full verbosity setting is selected, making a determination to provide an announcement of the string describing the attribute change.

10. The computer-implemented method of claim 1, wherein determining whether to alert the user of the attribute change based on the verbosity settings further comprises determining when to alert the user.

11. The computer-implemented method of claim 10, wherein determining when to alert the user comprises determining to alert the user after a space or other word-breaking opportunity character is identified and echoed by the AT application.

12. A system for notifying a user of an assistive technology (AT) application of metadata changes in a document authored by a productivity application, the system comprising a computing device, the computing device comprising:
   at least one processing device; and
   at least one computer readable data storage device storing instructions for the productivity application that, when executed by the at least one processing device, are operative to:
      receive, at the productivity application, an indication of a change of an attribute on a text range in the document;
      determine whether the attribute change is relevant to the user; and
      when a determination is made that the attribute change is relevant to the user, send an event notification of the attribute change to the AT application to enable an alert notifying the user of the attribute change to be generated and provided to the user based on verbosity settings.

13. The system of claim 12, wherein in determining whether the attribute change is relevant to the user, the instructions are operative to:
   identify a type of the attribute change and a location of the attribute change; and
   make a determination as to whether the location of the attribute change is within a text range that is considered relevant to the user based on the type of the attribute change.

14. The system of claim 12, wherein the instructions are further operative to generate a string describing the attribute change.

15. The system of claim 14, wherein when the attribute change comprises a plurality of attribute changes, the instructions are operative to:
   aggregate the plurality of attribute changes; and
   generate a string describing the plurality of attribute changes for enabling the AT application to communicate a general summary of the plurality of attribute changes.

16. The system of claim 14, wherein in sending the event notification of the attribute change to the AT application to enable the alert notifying the user of the attribute change to be generated and provided to the user based on the verbosity settings, the instructions are further operative to include a payload with the event notification, the payload comprising:
   an identifier for the attribute change; and
   the string describing the attribute change.

17. The system of claim 16, wherein the verbosity settings are selected by the user and include one of:
   a quiet verbosity setting;
   a discreet verbosity setting; and
   a full verbosity setting.

18. The system of claim 17, wherein:
   when the quiet verbosity setting is selected, an alert is not provided to the user;
   when the discreet verbosity setting is selected, an audible alert based on a type of the attribute change is provided on a parallel audio channel mixed over text narration by the AT application; and
   when the full verbosity setting is selected, an announcement of the string describing the attribute change is provided.

19. A computer readable storage device including computer readable instructions, which when executed by a processing unit is operative to:
   receive, at a productivity application, an indication of a change of an attribute on a text range in a document authored by the productivity application;
   determine whether the attribute change is relevant to a user of an assistive technology (AT) application; and
   when a determination is made that the attribute change is relevant to the user, send an event notification of the attribute change to the AT application to enable an alert notifying the user of the attribute change to be generated and provided to the user based on verbosity settings.

20. The computer readable storage device of claim 19, further comprising when the attribute change comprises a plurality of attribute changes, aggregate the plurality of attribute changes;
   generate a string describing the plurality of attribute changes for enabling the AT application to communicate a general summary of the plurality of attribute changes; and
   send the event notification including a payload comprising:
      an identifier for the attribute change; and
      the string describing the attribute change.

* * * * *